United States Patent [19]

Guymon

[11] Patent Number: 5,195,847
[45] Date of Patent: Mar. 23, 1993

[54] PROCESS FOR CLEANING DRILLING MUD CONTAMINATED WITH HYDROCARBONS

[76] Inventor: E. Park Guymon, 4085 Eccles Ave., Ogden, Utah 84403

[21] Appl. No.: 821,018

[22] Filed: Jan. 15, 1992

[51] Int. Cl.$^5$ .............................................. C09K 7/02
[52] U.S. Cl. .................................... 405/128; 208/13; 210/708; 210/787; 175/66; 252/331
[58] Field of Search ................... 208/13, 390; 210/708, 210/787; 405/128; 175/66; 252/331

[56] References Cited

U.S. PATENT DOCUMENTS

| | | | |
|---|---|---|---|
| 4,451,377 | 5/1984 | Luxemburg | 210/708 |
| 4,599,117 | 7/1986 | Luxemburg | 210/708 X |
| 4,645,608 | 2/1987 | Rayborn | 175/66 X |
| 4,812,225 | 3/1989 | Gorti et al. | 208/13 |
| 5,039,450 | 8/1991 | Kupfer et al. | 210/708 X |
| 5,080,721 | 1/1992 | Flanigan et al. | 210/787 X |

*Primary Examiner*—Dennis L. Taylor
*Assistant Examiner*—Arlen L. Olsen
*Attorney, Agent, or Firm*—J. Winslow Young

[57] ABSTRACT

A process for recovering hydrocarbon contaminants from a drilling mud by adding a hydrocarbon diluent along with a wash water to create an emulsion. The wash water having a surfactant dissolved therein. The resultant emulsion is subjected to centrifugation which produces three distinct layers that can be easily separated to produce a clean drilling mud, a clear wash water, and a hydrocarbon phase containing the hydrocarbon contaminant and the hydrocarbon diluent.

7 Claims, No Drawings

PROCESS FOR CLEANING DRILLING MUD CONTAMINATED WITH HYDROCARBONS

BACKGROUND

1. Field of the Invention

This invention relates to drilling muds and, more particularly, to a novel process for removing hydrocarbon contaminants from used drilling mud.

2. The Prior Art

Hydrocarbons such as crude oil and natural gas are recovered from wells or boreholes drilled deep into the earth. Conventionally, the borehole is drilled using a rotary drill bit on the end of a rotatable, hollow drill stem. A drilling fluid is pumped downwardly through the hollow drill stem to cool and lubricate the drill bit while at the same time carrying the cuttings upwardly through the annular space surrounding the drill stem. The drilling fluid and the cuttings are circulated to the surface where the cuttings are removed so that the drilling fluid can be recycled into the system. Customarily, water is the primary ingredient of this drilling fluid along with specific types of clays and other additives which are included to create a drilling fluid having preselected characteristics to meet the requirements of the particular formation being drilled. Due to the presence of clay in the drilling fluid, the drilling fluid is commonly referred to as "drilling mud" or simply as "mud."

Clearly, the term "mud" is too simplistic to give one a true picture of the significant body of science that has evolved over the past century in the field of drilling fluids. Numerous advances have been made in the formulations for drilling muds to be used under various applications. Clay, of course, is the major ingredient and is usually selected from clays such as bentonite, attapulgite, and sepiolite, to name a few. Various additives are blended into the drilling fluid to develop viscosity, control fluid loss, reduce corrosion, control the rheological properties under extreme conditions of temperature and contamination, and act as a filtration control agent, for example.

Ultimately, the borehole is drilled to its preselected depth through the desired hydrocarbon-producing formation. During this phase of the drilling operation significant quantities of hydrocarbons from the formation become incorporated with the drilling mud, which means that the drilling mud becomes contaminated with hydrocarbons thereby creating a hazardous waste problem. This problem is particularly exacerbated by the nature of the drilling mud in the first place, namely, that great care is taken to assure that the clay material remains suspended in the drilling fluid and thereby does not plug the producing formation. This fact and the presence of hydrocarbons means that the cleanup of contaminated drilling mud presents a particularly troublesome cleanup problem.

In view of the foregoing, it would be an advancement in the art to provide a process for removing hydrocarbons from drilling mud residues. It would be an especially significant advancement in the art to provide a process for not only separating hydrocarbon residues from a drilling mud residue but also to separate a relatively clean water from the drilling mud. Such a novel process is disclosed and claimed herein.

BRIEF SUMMARY AND OBJECTS OF THE INVENTION

This invention relates to a novel process for recovering hydrocarbons from a drilling mud. The process also recovers water in a relatively clean state. The process involves adding a hydrocarbon diluent such as kerosene, diesel, or recovered hydrocarbon while mixing the resultant drilling mud and hydrocarbon diluent with a water/surfactant solution to produce a homogeneous mixture which is then subjected to centrifugation to achieve a relatively clean separation of hydrocarbons, (both hydrocarbon contaminant and hydrocarbon diluent) water, and clay residues as three, distinct layers.

It is, therefore, a primary object of this invention to provide improvements in the process of removing hydrocarbon contaminants from drilling muds.

Another object of this invention is to provide a novel process for recovering hydrocarbon contaminants from a drilling mud whereby a hydrocarbon diluent is added to the contaminated drilling mud in order to facilitate separation of the hydrocarbon from the drilling mud with a water and surfactant solution.

Another object of this invention is to provide a process for providing a relatively clean separation of a hydrocarbon-contaminated drilling mud into a hydrocarbon phase, a water phase, and a solids phase.

These and other objects and features of the present invention will become more readily apparent from the following description in which preferred and other embodiments of the invention have been set forth in conjunction with the appended claims.

GENERAL DISCUSSION

Drilling mud serves a number of valuable functions in the drilling industry whether for oil or gas wells, water wells, excavating, or minerals extraction. Regardless of the general nature of its application, drilling mud is used to lubricate the drill stem, cool the drill bit, seal the hole against fluid loss, and carry cuttings to the surface, among other functions. Each specific application involves an additive that is specifically designed to selectively alter the mud properties as a function of the conditions encountered in the hole. For example, sodium carboxymethylcellulose (CMC) is added to the drilling mud when water loss control and wall cake formation are required in fresh water, drilling mud systems. This cellulose polymer controls water loss, builds a thin, impervious wall cake, adheres to the formation surface to protect shales, and coats the cuttings to inhibit buildup of unwanted solids in the drilling mud. It is also available in a range of viscosity grades.

Other types of cellulosic polymers are usable in either fresh or salt water and provide the foregoing advantages in addition to inhibiting swelling and disintegration of clay solids with little change in flow properties. Small additions of these materials form the basis for a nondispersed drilling mud system effective to remarkable depths. They can be used in practically any kind of make-up water; fresh, brackish, or seawater, to create a minimumsolids fluid that is superior to clear water for providing a fast drilling rate.

Thinners are also used to thin and condition the drilling mud. In particular, as drilling operations have become more and more complex, the requirements of a mud thinner have increased. One desirable feature of a mud thinner is that it must promote low solids while performing at low concentrations. It must also remain effective over wide ranges of temperature and contamination. It should also prevent packer muds from "setting up" while controlling the shear strengths of such muds.

The foregoing has been presented herein to clearly demonstrate the need for a process for recovering hydrocarbon contaminants from drilling muds. In particular, modern drilling muds represent a significant disposal problem so that the presence of hydrocarbons exacerbates the problem significantly.

I have attempted to process a hydrocarbon-contaminated drilling mud using only a solution of surfactant in water as a means for removing the hydrocarbon contaminant. However I found that I could not obtain satisfactory mixture of the water/surfactant with the drilling mud to obtain any suitable cleansing effect. The hydrocarbon-contaminated drilling mud and the water/surfactant solution remained as essentially two, distinct phases. Surprisingly, I found that the addition of a hydrocarbon diluent such as kerosene, diesel, or the like, to the foregoing resulted in a homogeneous mixture. This homogeneous mixture was readily created upon agitation of the container and readily separated into three distinct layers upon centrifugation. At present, I am not certain of the precise mechanism by which this startling phenomenon occurs. However, it does work to such a degree that the drilling mud is essentially hydrocarbon free sufficient to exceed the current minimum standards of the Environmental Protection Agency.

DETAILED DESCRIPTION

A first sample of hydrocarbon-contaminated drilling mud was obtained and was analyzed as having an oil contamination of 10% (w/w). The drilling mud was also found to contain barium sulfate as an additive. This drilling mud was insoluble in either water or a water-surfactant mix. Upon standing, a small amount of oil seeped out of the drilling mud and contained about 50% (w/w) solids. This seep oil was mixed with an equal amount of nonionic surfactant of the product class alcohol ethoxylate and shaken to produce a homogeneous emulsion that was thick and reddish-brown in color. This emulsion was subjected to centrifugation (2,500 g's) in a batch centrifuge where it separated into three phases with the reddish colored clay in the bottom, a clear, water-surfactant layer in the middle, and a layer of oil on top. The separation between the oil layer and the water-surfactant layer was very cleancut, definite, and easily separable.

A second experiment was run using the drilling mud residue from the first experiment. This material consisted of a mixture of liquid oil and solid oil/drilling mud which even the most vigorous mixing could not form an homogeneous mixture with a water/surfactant solution. Realizing that this system had a lower hydrocarbon content as a result of removal of the seep oil in the first experiment, I mixed kerosene with the drilling mud in an attempt to make the drilling mud higher in hydrocarbons than its original hydrocarbon concentration. This mixture was shaken by hand in its original glass container. An homogeneous mixture similar to the homogeneous mixture of the first experiment was formed. Upon centrifugation, three distinct phases were formed.

This was a surprising discovery! I found that the addition of a sufficient amount of hydrocarbon diluent to a mixture of solid, hydrocarbon-contaminated drilling mud and surfactantcontaining water would form an homogeneous mixture upon agitation; and that this homogeneous mixture, when centrifuged at forces greater than about 1,000 g's, formed three distinct layers. Separation of the resultant layers was a simple task and produced relatively clean phases.

The oil phase contained about 0.5% (w/w) solids while the drilling mud layer contained about 30% (w/w) water and its appearance was comparable to an ordinary, wet clay. Upon drying, the surface of the drilling mud developed a darker color which, upon extraction of the dried drilling mud with hexane, was disclosed as an oil residue that constituted less than 1.0% (w/w) oil in the dried drilling mud. This is a remarkable discovery particularly since the goal sought by the Environmental Protection Agency is less than 2% (w/w) residual oil in the dried drilling mud.

A third experiment was conducted using kerosene along with water but in the absence of a surfactant. A similar, homogeneous emulsion was formed but, upon centrifugation, the water layer was a cloudy brown water and the interface of the oil and water was indistinct indicating a high level of drilling mud in the oil as well as an unacceptable level of oil and drilling mud in the water. Further analysis revealed 4.39% (w/w) drilling mud solids in the oil phase which is unacceptable.

The presence of surfactant resulted in a dramatic drop in the amount of drilling mud in the oil phase to less than 1.0% (w/w). It is believed that the surfactant aids in the formation of larger drilling mud/water agglomerated particles which settle out more readily under centrifugation.

EXAMPLE I

In this first example, 1,800 g. of heavy drilling mud was obtained and analyzed for its oil contamination and found to contain 10% (w/w) oil. This was mixed with 400 g. diesel fuel and 600 g. of water containing 0.4% (w/w) alcohol ethoxylate surfactant. The surfactant was designated as 81-8 surfactant (8 carbon atoms and 8 ethylene oxide groups).

Upon agitation the mixture formed a very thick, homogeneous mixture which, upon centrifugation at 5,000 rpm (2,500 g's.) for ten minutes, produced three distinct layers. The water/surfactant layer was clear indicating essentially no oil or drilling mud in the water phase. Further analysis determined the presence of 0.75% (w/w) solids residue in the oil phase and 1.3% (w/w) oil in the drilling mud (dry basis). The drilling mud phase contained about 30% (w/w) water.

EXAMPLE II

In this second example, heavy drilling mud, 600 g., 10% (w/w) oil, was mixed with 280 g. of diesel fuel and 400 g. of water (containing 0.4% (w/w) 81-8 surfactant) and, when mixed, formed a very thin homogenous mixture. Centrifugation at 5,000 rpm (2,500 g's.) for ten minutes produced three distinct layers with only 0.35% (w/w) drilling mud residue in the oil phase and only 0.47% (w/w) oil in the drilling mud (dry basis). The drilling mud layer contained 36% (w/w) water while the water phase was clear.

From the foregoing, I have concluded that, as a general rule, the greater the ratio of liquids, including the added oil diluent, the cleaner will be the drilling mud and the recovered oil. The surfactant is necessary to remove the drilling mud from the oil. The type of surfactant did not matter although previous work I have done shows that the activity of the surfactant increases with a shorter carbon chain but with more ethylene oxide groups up to about eight. More than eight ethylene oxide groups in the surfactant tends to produce an emulsion that is difficult to break. Previous work indicates the necessity for using a less active surfactant such as 315-3.

The addition of an oil diluent results in the formation of an homogeneous mixture with very little mixing as long as surfactant was also present in the water. The more oil was added, the thinner the homogeneous mixture and the cleaner the separation. The source of hydrocarbon or oil was initially a diesel fuel but could easily be obtained from the recovered oil, a portion which could be recycled to aid in cleaning succeeding quantities of drilling mud contaminated with hydrocarbons. Further, I found that the order of addition of the three phases was not important.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A process for recovering hydrocarbons from a drilling mud contaminated with a first hydrocarbon comprising:
   placing said drilling mud contaminated with said first hydrocarbon in a vessel;
   obtaining a predetermined quantity of water;
   selecting a surfactant and dissolving said surfactant in said water to form a wash water;
   combining said wash water with said drilling mud contaminated with said first hydrocarbon;
   providing a second hydrocarbon as a diluent, said second hydrocarbon comprising said first hydrocarbon and mixing said hydrocarbon diluent to said wash water and said drilling mud contaminated with said first hydrocarbon to form a mixture;
   subjecting said mixture to centrifugation thereby separating said mixture into three distinct layers comprising a first layer of said first hydrocarbon recovered from said drilling mud and said second hydrocarbon diluent, a second layer of said wash water, and a third layer of said drilling mud wetted with said wash water; and
   recovering said first layer containing said first and second hydrocarbons.

2. The process defined in claim 1 wherein said providing step includes determining the amount of said first hydrocarbon contaminant in said drilling mud contaminated with said first hydrocarbon and adding an incrementally greater quantity of said first hydrocarbon as said diluent to said mixture.

3. The process defined in claim 1 wherein said selecting step includes maintaining a relatively low concentration of surfactant thereby precluding emulsifying said hydrocarbon contaminant and said hydrocarbon diluent with said wash water.

4. The process defined in claim 1 wherein said mixing step comprises forming an homogeneous mixture of said drilling mud, said first hydrocarbon contaminant, said first hydrocarbon diluent, and said wash water.

5. A process for cleaning a drilling mud by recovering hydrocarbon contaminants from said drilling mud comprising:
   selecting a quantity of drilling mud having a first hydrocarbon as a hydrocarbon contaminant therein and placing said drilling mud in a vessel;
   preparing a wash water by dissolving a surfactant in water;
   obtaining an additional quantity of said first hydrocarbon as a hydrocarbon diluent;
   forming an homogenous mixture in said vessel by mixing said wash water and said hydrocarbon diluent with said drilling mud;
   separating said homogeneous mixture into a hydrocarbon phase, a water phase, and a clean drilling mud phase by subjecting said homogeneous mixture to centrifugation;
   recovering said hydrocarbon phase, said hydrocarbon phase comprising said hydrocarbon contaminant and said hydrocarbon diluent; and
   removing said water phase from said clean drilling mud phase.

6. The process defined in claim 5 wherein said forming step includes determining the amount of said hydrocarbon contaminant in said drilling mud contaminated with said hydrocarbon and adding and incrementally greater quantity of said hydrocarbon contaminant as said hydrocarbon diluent to said mixture.

7. The process defined in claim 5 wherein said preparing step includes maintaining a relatively low concentration of surfactant thereby precluding emulsifying said hydrocarbon contaminant and said hydrocarbon diluent with said wash water.

* * * * *